United States Patent [19]

Illakowicz

[11] Patent Number: 4,675,473

[45] Date of Patent: Jun. 23, 1987

[54] FLEXIBLE CONDUCTOR FOR WELDING

[75] Inventor: Jan Illakowicz, New Orleans, La.

[73] Assignee: McDermott Incorporated, New Orleans, La.

[21] Appl. No.: 924,661

[22] Filed: Oct. 30, 1986

[51] Int. Cl.⁴ .................... H01R 11/01; B23K 35/02
[52] U.S. Cl. .................................. 174/68 R; 439/502
[58] Field of Search ............ 174/15 WF, 68 R, 74 R, 174/129 R, 129 B; 339/28, 29 R, 263 L, 275 RB, 276 RB; 238/14.1, 14.11; 219/66, 137.9

[56] References Cited

U.S. PATENT DOCUMENTS 1,181,250  5/1916  Renshaw .................... 339/263 L X
2,462,993  3/1949  Peters et al. ................ 174/129 B X
3,231,851  1/1966  Abel et al. ..................... 339/29 R X
3,907,391  9/1975  Emery et al. ..................... 339/29 R Primary Examiner—Laramie E. Askin
Attorney, Agent, or Firm—Robert J. Edwards; D. Neil LaHaye

[57] ABSTRACT

A welding conductor having a curved stack of flexible copper leaves which have an inside curved surface. Resilient metal shims bear against the inside surface to urge opposite ends of the stack outwardly. The outer end of the stack is connected, for example, by welding, to an outer plate which carries an outer copper shoe. The inner end of the stack is welded to an inner plate. A fire-resistant ceramic cloth surrounds the stack to protect the metal leaves.

7 Claims, 2 Drawing Figures

FLEXIBLE CONDUCTOR FOR WELDING

FIELD AND BACKGROUND OF THE INVENTION

The present invention relates, in general, to the field of welding and, in particular, to a new and useful flexible conductor which is particularly useful in the flash butt welding of pipes.

Welding equipment is known which can be used on the interior of pipes to be welded together. U.S. Pat. No. 4,525,616 to Slavens discloses one example of such welding equipment. It is also known to utilize flexible arcuate conductors to pass welding current from a power source to a conducting member which is urged against metal to be welded. See, for example, U.S. Pat. No. 4,187,406 to Fencl et al.

The use of multiple flat sheets of conductive material which are squeezed together to form a conductor is also known from U.S. Pat. No. 3,828,111 to Berthet and U.S. Pat. No. 3,882,265 to Johnston et al.

SUMMARY OF THE INVENTION

The present invention comprises a flexible conductor which is particularly useful in the flash butt welding together of pipes and which includes a metal shoe which is to be positioned inside the pipe to be welded and which is to be urged outwardly by a flexible conductor assembly that includes a stack of flat metal leaves and resilient shims. The metal leaves conduct electricity to the shoe and the shims produce a spring action for urging the shoe outwardly against the inner wall of a pipe to be welded.

The connector assembly is wrapped in a ceramic cloth fire-resistant sleeve to prevent the entry of dust or other foreign particles between the metal leaves.

An inner metal plate is welded to the inner ends of the metal leaves while an outer metal plate is welded to the outer ends of the metal leaves. The outer metal plate is also welded to the metal shoe. In accordance with one advantageous feature of the invention, the thin metal leaves are welded to the inner and outer plates by electron beam welding.

In more detail, the present invention includes a flexible conductor for welding which comprises: a metal shoe; a curved stack of flexible metal leaves having an inside curved surface and an outside curved surface, said stack having an inner end and an outer end; an inner connecting plate connected to said inner end of said stack; an outer connecting plate connected between said outer end of said stack and said metal shoe for supporting said metal shoe on said stack; and a plurality of curved shims each connected to at least one of said inner and outer plates and engaged against said inside curved surface of said stack for resiliently urging said outer end of said stack away from said inner end of said stack.

A further feature of the present invention is the connection of the ends of the stack to the connecting plates using electron beam welding. This is more suitable than soldering or other ways of connecting the metal leaves to the connecting plates.

A still further feature of the present invention is the provision of a ceramic cloth fire-resistant sleeve around the stack particularly to prevent entry of dust or other particles into edges of the stack and between the flexible metal leaves.

By means of the foregoing features, the object of the invention, which is to provide a flexible conductor for welding which is simple in design, rugged in construction and economical to manufacture, is attained.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
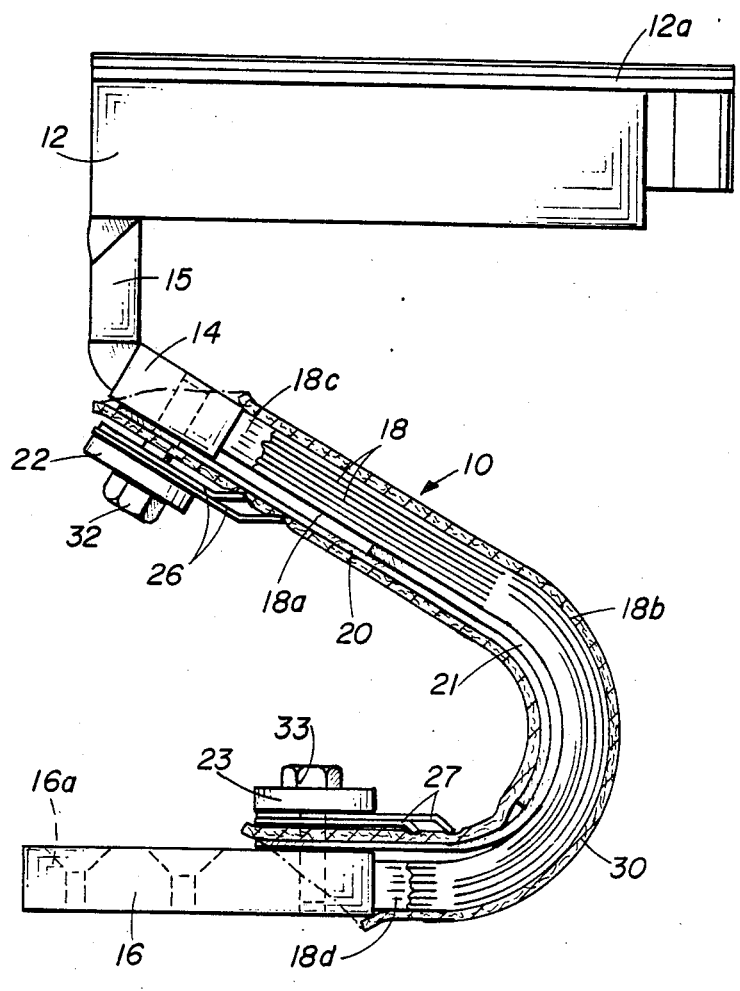
FIG. 1 is a side elevational view, partly in section, showing the flexible conductor of the present invention.
Figure 2:
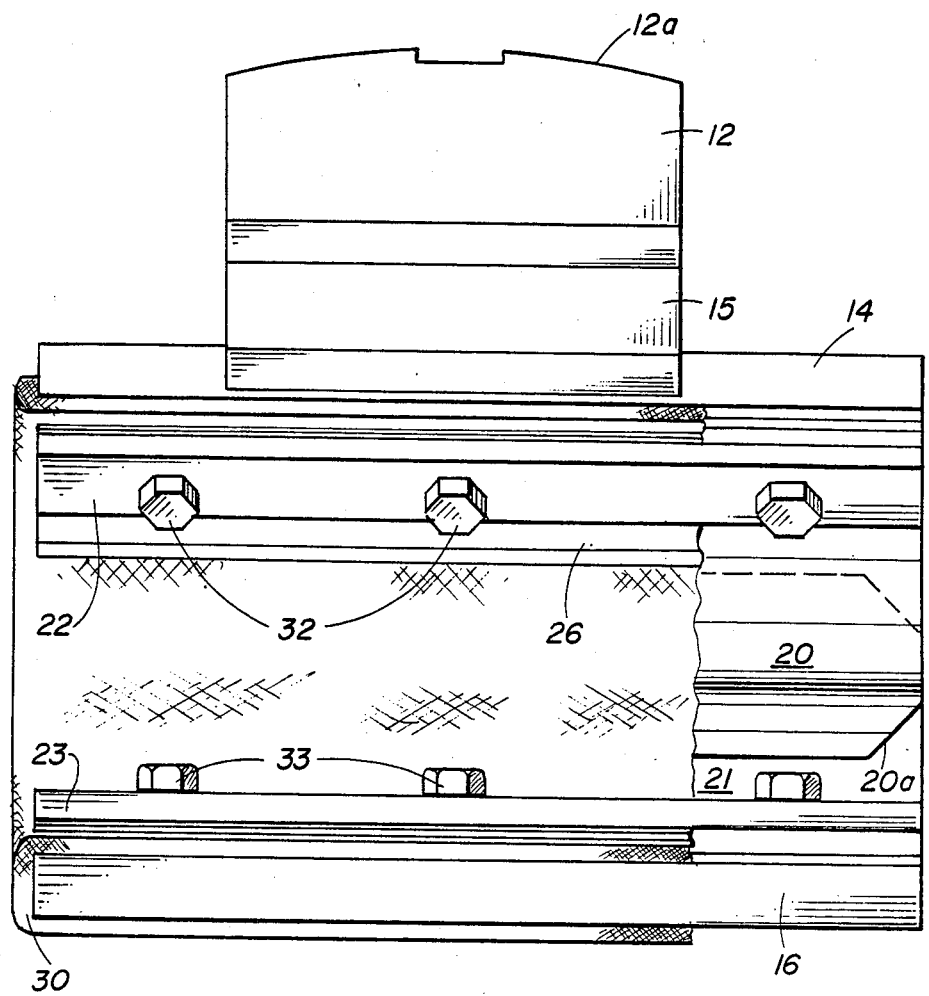
FIG. 2 is a front elevational view of the conductor shown in FIG. 1 with portions cut away for clarity.

Referring to FIG. 1, the invention embodied therein comprises a flexible conductor for use in welding together ends of pipes from the inside of the pipes. Ends of the pipes (not shown) are brought together and a welding current passed between the pipes to cause a flash butt welding together of the pipes. To this end, the flexible conductor of the present invention comprises a metal shoe 12, which advantageously is made of copper and which is connected to a flexible conductor assembly generally designated 10. As shown in FIG. 2, the copper shoe 12 has an upper curved surface 12a which is resiliently engaged against the inside surface of a pipe to be welded.

The flexible conductor assembly 10 comprises a curved stack of flexible flat metal leaves 18 which advantageously are made of copper. In one embodiment of the invention, there are 160 copper leaves 18 each having a thickness of 0.05 mm. The stack of leaves has an inside curved surface 18a and an outside curved surface 18b.

An outer connecting plate 14 is welded at 18c to the outer end of the stack of leaves 18 and an inner connecting plate 16 is connected at weld 18d to the inside end of the stack of leaves 18.

Outer plate 14 is also welded to an intermediate plate 15 which, in turn, is welded to copper shoe 12.

Plates 14, 15 and 16 are also advantageously made of copper.

In accordance with an advantageous feature of the invention, welds 18c and 18d are formed by electron beam welding. This has been found to produce a weld with strong characteristics which is particularly suited for passing high welding currents. Plates 14 and 15 and shoe 12 may also be connected together using electron beam welding.

Welds 18c and 18d may also be achieved through soldering or diffusion bonding, but these are not as desirable as electron beam welding since soldering may be unsuited for use in a flexible welding connection and diffusion bonding may not have consistent quality.

In accordance with another advantageous feature of the invention, a plurality of resilient metal shims 20 and 21 are engaged against the inside surface 18a of the stack of leaves 18. The shims may be of different length. Shim 20 has its outer end connected to plate 14 by clamp plate 22 and bolt 32 which extends through holes in the clamp plate 22 and in the shim 20. In likewise fashion, shim 21 is connected to plate 16 by a clamping plate 23 and bolts 33. Ends of shims 20 and 21 overlap each other as shown in FIG. 1 and resiliently urge the inner and outer ends of the stack 18 away from each other to produce an outer clamping effect for shoe 12.

The inner connecting plate 16 has a plurality of countersunk and tapped holes 16a which can be used to connect connecting plate 16 to a mount for supplying welding current to the inner end of the stack of leaves 18.

To better press the shims 20 and 21 against the inside curved surface 18a of the stack of leaves 18, one or more leaf springs 26 and 27 are engaged between clamping pltes 22 and 23 and the respective inner and outer connecting plates 14 and 16. Leaf springs 26 and 27 have bent ends which bend toward the inside surface 18a.

To preclude the entry of dust and other particles between leaves 18 of the stack of leaves, the entire conductor assembly 10 is wrapped by a sleeve 30 of ceramic fire-resistant cloth. Springs 26 and 27 may bear on the outside of the cloth or the cloth may be wrapped over the springs 26 and 27. Bolts 32 and 33 extend through ends of the sleeve for securing the sleeve in place.

FIG. 2 shows part of the sleeve removed to expose the underlying shims 20 and 21. The shims may have doubled corners 20a to prevent the corners from biting into the relatively soft copper leaves 18.

The outer portion of stack 18 near connection 18c is inclined at an angle of about 25° to the horizontal or main plane of shoe 12 as seen in FIG. 1. In the embodiment shown, shoe 12 is spaced from the connecting end 18c of the stack by the length of intermediate plate 15 to leave sufficient clearance between shoe 12 and conductor assembly 10. This spacing may vary depending on the size of pipe being welded.

While a specific embodiment of the invention has been shown and described in detail to illustrate the application of the principles of the invention, it will be understood that the invention may be embodied otherwise without departing from such principles.

What is claimed is:
1. A flexible conductor for welding, comprising:
   a. a metal shoe;
   b. a curved stack of flexible metal leaves having an inside curved surface and an outside curved surface, said stack having an inner end and an outer end;
   c. an inner connecting plate connected to said inner end of said stack;
   d. an outer connecting plate connected between said outer end of said stack and said metal shoe for supporting said metal shoe on said stack; and
   e. a plurality of curved shims each connected to at least one of said inner and outer plates and engaged against said inside curved surface of said stack for resiliently urging said outer end of said stack away from said inner end of said stack.

2. A flexible conductor according to claim 1, including a fire-resistant sleeve engaged over said curved stack of flexible metal leaves and extending the length of said curved stack.

3. A flexible conductor according to claim 2, further comprising:
   a. an inner clamping plate connected to said inner connecting plate with an end of said sleeve between said inner clamping and connecting plates; and
   b. an outer clamping plate connected to said outer connecting plate with an opposite end of said sleeve engaged between said outer clamping and connecting plates.

4. A flexible conductor according to claim 1, further comprising at least one leaf spring connected to each of said inner and outer connecting plates, each leaf spring bearing against at least one of said shims.

5. A flexible conductor according to claim 4, further comprising a fire-resistant cloth sleeve engaged over said curved stack extending between said inner and outer ends of said curved stack.

6. A flexible conductor according to claim 5, wherein said inner and outer ends of said curved stack are connected to said inner and outer connecting plates respectively by electron beam welding.

7. A flexible conductor according to claim 1 wherein said inner and outer ends of said curved stack are connected to said inner and outer connecting plates respectively by electron beam welding.

* * * * *